Figure 2:
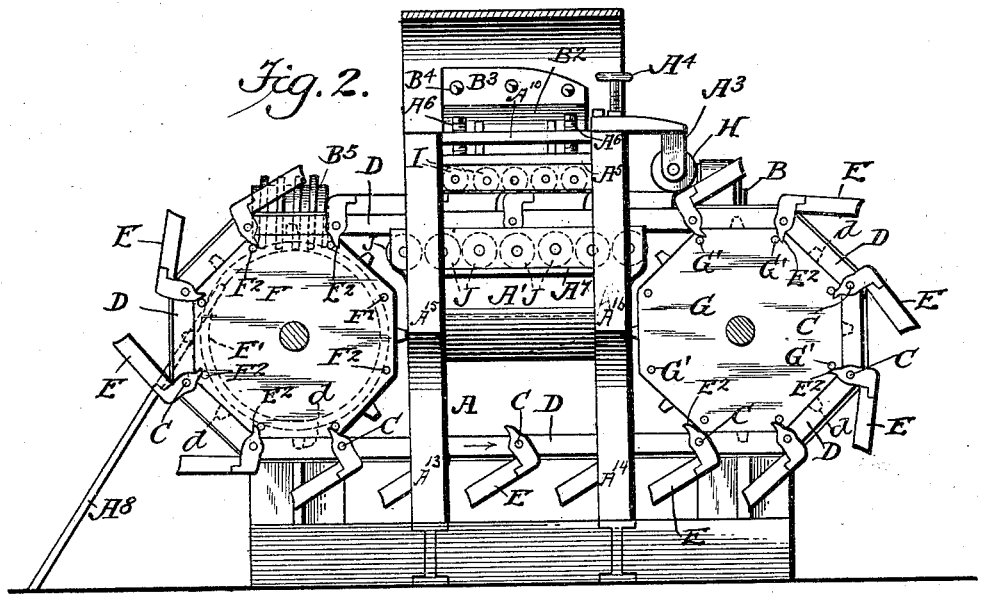

No. 705,140. Patented July 22, 1902.
M. PRIETO.
MACHINE FOR DISINTEGRATING FIBROUS PLANTS.
(Application filed Feb. 7, 1901.)
(No Model.) 2 Sheets—Sheet 1.
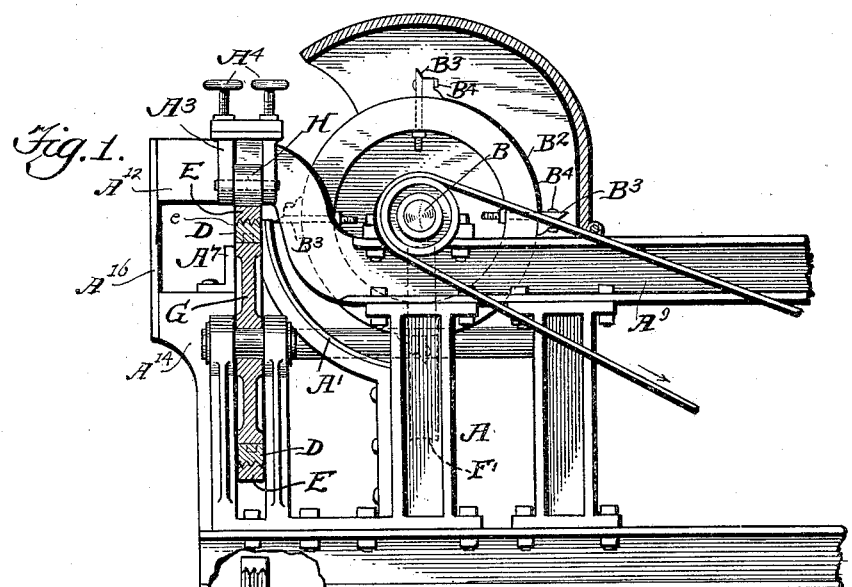
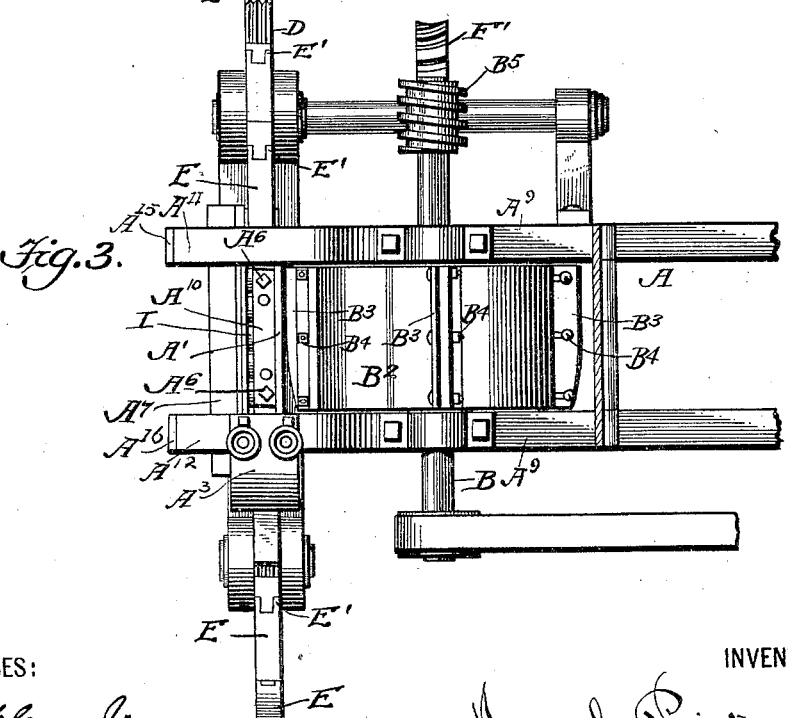
WITNESSES: INVENTOR
Manuel Prieto
BY
Thomas Drew Stetson
ATTORNEY No. 705,140. Patented July 22, 1902.
M. PRIETO.
MACHINE FOR DISINTEGRATING FIBROUS PLANTS.
(Application filed Feb. 7, 1901.)
(No Model.) 2 Sheets—Sheet 2.

WITNESSES:

INVENTOR
Manuel Prieto
BY
Thomas Drew Stetson
ATTORNEY

THE NORRIS PETERS CO., PHOTO-LITHO., WASHINGTON, D. C.

UNITED STATES PATENT OFFICE.

MANUEL PRIETO, OF MEXICO, MEXICO.

MACHINE FOR DISINTEGRATING FIBROUS PLANTS.

SPECIFICATION forming part of Letters Patent No. 705,140, dated July 22, 1902.

Application filed February 7, 1901. Serial No. 46,359. (No model.)

*To all whom it may concern:*

Be it known that I, MANUEL PRIETO, a citizen of Mexico, residing in the city of Mexico, Mexico, have invented a certain new and useful Machine for Disintegrating Fibrous Plants, of which the following is a specification.

The improved machine is more especially adapted for treating the leaves of a tropical plant commonly known as "lechuguilla," which is a species of aloe, and I will describe it as thus applied. The leaves may be previously treated by rollers, (not shown,) so as to partially crush the pulpy matter and the more or less tough integument which accompany the fiber; but there are objections to such provisions, and my experiments indicate that the machine can succeed without them.

I provide a rapidly-revolving cylinder or drum carrying dull knives or scrapers which in their traverse revolve in approximate but not actual contact with a strong concave bed. In the treatment I employ an endless chain which runs horizontally along the receiving side of the scraping-cylinder, and, holding the leaves near one end, the main portion of the leaf is carried laterally into the domain of the scraping-cylinder and becomes scraped. The carrying-chain may be moved steadily and slowly. After a leaf has been thus carried past the scraping-cylinder and a little more than half its length has been properly cleaned the partially-treated leaf is released, and the other end is afterward similarly treated. So far as yet described the machine for cleaning has been set forth in patents to my brother, Demetrio Prieto, one dated May 24, 1883, No. 278,668, and another dated February 17, 1891, No. 446,791. The holding the leaf with sufficient firmness involves difficulties. These are especially felt in the second treatment, because of the smallness and smooth qualities of the cleaned fiber to be gripped. The previous machines were of great weight and bulk. I have devised important improvements. I can operate successfully with a single scraping-cylinder and a single carrying-chain with a proper series of clamps and operating means therefor.

The following is a description of what I consider the best means of carrying out the invention.

The accompanying drawings form a part of this specification.

Figure 4:
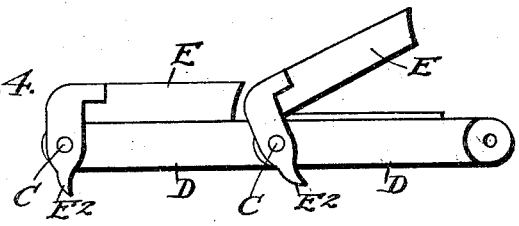
Figure 5:
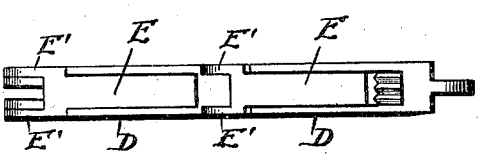
Figure 6:
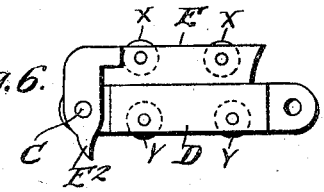
Figure 7:
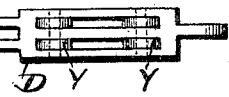

Figure 1 is a side elevation. Fig. 2 is a face view, and Fig. 3 is a plan view. Fig. 4 is a front view of certain portions on a larger scale. Fig. 5 is a corresponding plan view. Fig. 6 is a side view, and Fig. 7 a plan view, of a portion with a modification.

Similar letters of reference indicate corresponding parts in all the figures where they appear. Certain parts will be designated when necessary by supernumerals.

A is the framing, of cast-iron or other suitable material.

B is a rapidly-revolving shaft strongly supported on well-lubricated axles in the framing, on which is set a drum $B^2$, carrying scrapers or beaters $B^3$, with confining and adjusting means $B^4$. Their outer edges are carefully adjusted to follow each other in the same cylindrical path, and A' is a correspondingly-curved casing strongly supported on the framing to lie close to such path. There should be no more space between this surface and the main portion of the edges of the scrapers than is required to allow the cleaned fibers to extend downward in the curved way thus provided. This way is open at each side. The scrapers are narrowed at the receiving side.

I provide an endless chain composed of uniform links D, connected by loose rivets C, which also loosely connect a strong clamp E, which is forked to extend down and engage the ends of said rivets. There is one clamp for each rivet, and consequently for each link of the chain. The length of the clamp is nearly equal to the length of the link, a little space being allowed to accommodate the motions. The outer faces of the links D and the inner faces of the clamps E are grooved longitudinally, and the grooves $e$ are made to match to each other, as clearly indicated in Fig. 1. The forks or wings E', by which the clamps are connected to the rivets, extend a little inward of the inner face of the chain, constituting the endless leaf-holding carrier, as shown by $E^2$ in Figs. 4 and 6. The chain is arranged to traverse continuously in a path close to the upper edge of the curved and close-fitting bed or casing A', running over two polygonal wheels F and G, one of which, the wheel F, as shown, is provided with a worm-wheel F', firmly set on the same shaft and which is engaged by a worm $B^5$ on the shaft. (See Fig. 3.) The connections insure that while the scrapers $B^3$ revolve rapidly to remove the waste material of the leaf and throw it out idly, leaving the fiber extending down the inner face of the casing A', the wheels F and G revolve slowly and give a corresponding motion to the chain D and its connected clamps E, receiving the leaves at one point and traversing them laterally relatively to themselves and longitudinally of the scraping-cylinder until they have traversed so far that they are out of the influence of the latter, after which the clamps release their hold. Each link has a recess $d$ at the mid-length of its inner face, and the polygonal wheels F and G are each provided with nearly-corresponding projections, which match therein. The clamps require to be held open successively at the periods when each is to receive its one or more leaves. This is effected by the aid of projecting pins G', set in one face of the wheel G, so that each makes contact at the proper time with the rounded horn $E^2$ at the lower end of the fork E' of each clamp as it is moved past and lifts the clamp and maintains such lifted condition for the required period. Only a moderate force is required to perform this action, and the construction and adjustment will involve no difficulty.

II is a roller mounted in a fork $A^3$, which may be adjusted by a screw $A^4$. It is arranged to be struck by the outer face of each clamp in its passage and to close the clamp down upon the corresponding link D of the chain. This closure holds the leaf, but not with sufficient force for the strong pull which it is to experience when by the forward motion of the chain and clamp it is presented to the action of the scrapers.

$A^5$ is a movable portion of the framing, secured by bolts $A^6$, capable of being adjusted upward and downward. It is equipped with rollers I I, which are set to each induce a reliable and strong pressure on the upper surface of each clamp as it is traversed past the scrapers. $A^7$ is a corresponding frame, which may be adjustable, if preferred, strongly fixed on the framing A and carrying a series of rollers J, which act against the smooth inner and lower faces of the several links D as they are moved past. The downward pressure of the upper rollers I on the clamps is resisted by the support of the rollers J on the under faces of the links, and the grooved surfaces between the links and the clamps are thereby forced together and constitute the required strong grip first on the untreated end of the leaf and after the turning on the treated end. Any difference in the grip required to accommodate these two conditions or to accommodate any other changes, as more or less strong and thick leaves, may be attained by the adjustment of the upper framing $A^5$, and consequently the upper rollers I.

For the liberation of the material from the clamps and chain after it has undergone the severe treatment in passing the scraping-cylinder I also provide the drum F with projecting pins $F^2$, as shown, so as to receive the horns $E^2$ successively, and thereby throw the several clamps open and hold them open as they pass, and one or more deflecting bars or clearers $A^8$, inclined, as shown, on each side of the wheel F, which will deflect the material outward successively and leave the chain and its clamps empty again ready to receive fresh supplies, and so on.

It is important in placing the leaves on the chain to be seized by the clamp for the first treatment that so much be allowed to project toward the scraping-cylinder that a little more than half the length of the leaf shall be cleaned in the first passage. If this is effected, it is easy to transport the leaves by hand in larger or smaller instalments from the delivering-point to the feeding-point and, having reversed their position, to place them anew successively in the same relation as before on the chain and clamp them.

The bar or adjustable frame $A^5$, carrying the rollers I, may usually be set at such height that the machine will hold properly either the leaf in its original condition as introduced the first time or the fiber remaining after the first treatment as presented for the second treatment; but if in any case difficulty is experienced from this source the machine may be worked for a considerable time with the bar $A^5$ set higher in treating one end of each of a large lot of leaves and then the bar $A^5$ may be adjusted lower to make the grip closer, and thus to condition the machine for the second treatment.

As shown, the frame A is most advantageously formed (in connection with a suitable foundation and other necessary additions) of the two side frames $A^9$ $A^9$, connected with each other near their outer ends by the bar $A^{10}$, leaving the projections $A^{11}$ $A^{12}$ and the standards $A^{13}$ $A^{14}$, which are severally connected with said projections by means of the upright bars $A^{15}$ $A^{16}$. The standards $A^{13}$ $A^{14}$ are connected with each other by the framing $A^7$. The side frames $A^9$ $A^9$ carry the bearings for the shaft B of the beating or scraping drum $B^2$. The cross connecting-bar $A^{10}$ supports the upper rollers I through the set-screws $A^6$. The cross connection $A^7$ between the standards $A^{13}$ $A^{14}$ supports the lower rollers J.

By reason of the fact that my clamps when in the closed position lie parallel to the motion of the chain and open and close in the direction transverse to such motion I am able to obtain or to add to the force with which they are closed by provisions, as the bars $A^5$, with their rollers I, and the bars $A^7$, with their rollers J, between which the chain is traversed, conditioned to hold the leaves with extraordinary force while they are being acted on by the beating-cylinders. These rollers, as shown, constitute confining devices directly above and below the chain or leaf-holding carrier and its clamping-jaws, respectively, and are the best form of such devices by reason of the absence or diminution of friction.

Modifications may be made without departing from the principle or sacrificing the advantages of the invention.

I can omit the antifriction-rollers I and J and hold the clamps closed down by simply smooth surfaces with sufficient force upon their respective links to hold the leaf; but the friction is greater under those conditions. Fig. 6 shows antifriction-rollers X, carried in each clamp, and corresponding rollers Y, carried in each link. Such provisions will allow the machine to work successfully without the rollers I and J. I prefer the construction first described.

It is important to provide a fairly-liberal opening on the entering side between the revolving scrapers B³ and the curved bed A'. Instead of attaining this by narrowing the knives or scrapers at that end of each, as shown, I can keep the scrapers the full breadth throughout their lengths and correspondingly modify the form of the curved bed A'. The effect in either case is to treat the leaves very slightly, if at all, at that side of the path of the scraper where the leaves enter. As the leaves are, by the motion of the chain, moved across the path of the scrapers they enter the portions of the machine where the scrapers traverse with the proper contiguity to the bed to complete the work.

Parts can be used without the others. I can dispense with the clearers A⁸.

I claim as my invention—

1. In a machine for disintegrating fibrous plants, in combination with the scraping or beating mechanism thereof, an endless leaf-holding chain or carrier provided with a series of clamping-jaws hinged thereto and arranged to open and close by movements to and from the chain or carrier, a projection contacting with a portion of each jaw in a direction to hold the same open for the introduction of the leaves, and confining devices directly above and below the said chain or carrier and the said jaws, respectively, for keeping said jaws strongly closed while the leaves are carried past the said scraping or beating mechanism, substantially as described.

2. In a machine for disintegrating fibrous plants, in combination with the scraping or beating mechanism thereof, an endless leaf-holding chain or carrier provided on its periphery with a series of clamping-jaws hinged thereto by pivots transverse to the plane of motion of said chain or carrier and arranged to open and close by movements in said plane to and from the chain or carrier, a projection contacting with a portion of each jaw in a direction to hold the same open for the introduction of the leaves, and confining-devices directly above and below the said chain or carrier and the said jaws, respectively, for keeping said jaws strongly closed while the leaves are carried past the said scraping or beating mechanism, substantially as described.

3. In a machine for disintegrating fibrous plants, in combination with a scraping or beating drum, and with its coöperating casing or bed, a pair of wheels mounted on shafts below the shaft of said drum and at right angles thereto, with the upper portions of said wheels about on a level with the said drum-shaft, an endless leaf-holding chain carried on said wheels, a series of clamping-jaws hinged to said chain by pivots transverse to the plane of the chain's motion so that said jaws open and close by movements in said plane to and from the chain, a device contacting with a portion of each jaw as the latter passes over the top of one of said wheels for holding the jaw open for the introduction of the leaves, and confining devices directly above and below said chain and said jaws, respectively, for keeping said jaws strongly closed while the leaves are carried past the said drum and its said casing or bed, substantially as described.

4. The combination with means for scraping or beating, the endless leaf-holding chain, and the supporting-wheels, F and G, of the clamping-jaws, E, hinged to said chain and provided with horns E², and the projections or pins G² on the wheel G for holding the jaws open for the introduction of the leaves by contacting with the horns on said jaws, substantially as described.

5. The combination with the scraping or beating drum, its coöperating casing or bed, the side frames, the endless leaf-holding chain, and the opposing sets of confining devices mounted between said side frames, of the roller H independently mounted and arranged on the outer side of one of said frames in advance of both sets of said confining devices, substantially as described.

6. The combination with means for scraping or beating, and with the endless chain and its supporting-wheels F and G, of the clamping-jaws E hinged to said chain and provided with horns E², and the projections or pins F² on the wheel F for contacting with the horns on said jaws and thereby opening the jaws for the removal of the scraped or beaten leaves, substantially as described.

7. In a machine for disintegrating fibrous plants, in combination with a scraping or beating drum, and its coöperating casing or bed, a pair of wheels mounted on transverse shafts, an endless leaf-holding chain carried on said wheels with its upper portion about on a level with the axis of the said drum-shaft, a series of clamping-jaws hinged to said chain and provided with horns, projections or pins on each of said wheels for contacting with said horns in the direction for opening and holding open the jaws as the chain passes over the said wheels, respectively, and means for keeping the said jaws strongly closed while the leaves are carried past said drum and its said casing or bed, substantially as described.

8. In a machine for disintegrating fibrous plants, in combination with the scraping or beating mechanism thereof, an endless leaf-holding chain or carrier provided with a series of clamping-jaws hinged thereto and arranged to open and close by movements to and from the chain or carrier, devices contacting with portions of said jaws to open the same, respectively, before and after passing said scraping or beating mechanism, and confining devices directly above and below the said chain or carrier and the said jaws, respectively, for keeping said jaws strongly closed while the leaves are carried past the said scraping or beating mechanism, substantially as described.

In testimony that I claim the invention above set forth I affix my signature in presence of two witnesses.

MANUEL PRIETO.

Witnesses:
 ALFREDO MIRAND,
 ANTONIO ZIRION SARAVIE.